United States Patent

[11] 3,587,122

| [72] | Inventor | Gerald R. Humphrey<br>Pocasset, Mass. |
|---|---|---|
| [21] | Appl. No. | 850,762 |
| [22] | Filed | Aug. 18, 1969 |
| [45] | Patented | June 28, 1971 |
| [73] | Assignee | Benthos, Inc., North Falmouth, Mass. |

[54] OCEANOGRAPHIC SPHERICAL GLASS INSTRUMENT HOUSING
10 Claims, 6 Drawing Figs.

[52] U.S. Cl. .................................................. 9/8, 220/5
[51] Int. Cl. ...................................................... B63b 21/52
[50] Field of Search ........................................... 114/15, 16.3, 0.5; 9/8; 161/16; 220/4 (E), 5 (A), 4; 206/(Adhesive)

[56] References Cited
UNITED STATES PATENTS

| 1,918,109 | 7/1933 | Joyce ........................... | 206/1(UX) |
| 3,283,348 | 11/1966 | Farmer et al. ................. | 9/8 |
| 3,450,082 | 6/1969 | Demarest ....................... | 114/16 |

*Primary Examiner*—Trygve M. Blix
*Attorney*—Ralph L. Cadwallader

ABSTRACT: In one embodiment an oceanographic, spherical glass instrument housing having two hemispheres placed so that the outer surfaces are flush at a seam around an equator, has a bead of a nonhardening adhesive and a tape with a nonhardening adhesive surface applied to the equatorial seam. Another embodiment has only the tape applied to the equatorial seam. Both embodiments have a bead of nonhardening adhesives applied to a covered transverse edge of the tape.

PATENTED JUN 28 1971 3,587,122

INVENTOR
GERALD R. HUMPHREY
BY Ralph L. Cadwallader
ATTORNEY

OCEANOGRAPHIC SPHERICAL GLASS INSTRUMENT HOUSING

The present invention relates to oceanographic instrument housings and in particular to oceanographic, spherical glass instrument housings. The present application is a continuation-in-part of application, Ser. No. 845,222 filed July 28, 1969 and now abandoned.

In 1963 the need arose in oceanographic research for a combination float an instrument housing connected to a sediment corer and arranged to pull the core sample up to the surface of the sea from great depths and to operate the electronic flash recovery system associated therewith. The float had to be light in weight, compact, buoyant, durable, corrosion proof, inexpensive, transparent, and capable of use to depths of 6,000 meters. Permanently fused glass spheres had been manufactured for some time. However, spherical housings made of glass hemispheres sealed together, which would allow instruments to be mounted inside, enable the removal and maintenance of such instruments, and permit reuse of the housings, were not available. Applicant's assignee has in concert with others, developed new methods of manufacturing glass hemispheres of annealed borosilicate that are suitable for this purpose.

Glass is a most desirable material for instrument housings that are subjected to pressures at great depths of the sea. That this is true will be appreciated when one considers the compressive strength of glass which is, indeed, staggering. It has been proven to be over 300,000 p.s.i. and some investigators believe it to be over 1,000,000 p.s.i. Attempts to implode glass spheres under hydrostatic pressure with powered pins have been unsuccessful. With the spheres under 8,300 p.s.i. hydrostatic pressure, pins have been driven into them with forces of more than 3,000 pounds. In each case the tip of the pin was broken and its shank bent and flattened. The glass was scarcely harmed; tiny chips flaked off at the impact areas and the same spheres survived further testing to 10,000 p.s.i. without incident.

Concurrently with the development of the glass hemispheres, electrical and pressure feed-thrus were developed that could withstand the great pressures of deep sea usage. This made possible the utilization of such instrument housings provided a method of sealing the hemispheres together could be found which could be effectively used by researchers and others wishing to use them.

When the spherical housings made heretofore were subjected to water pressures of 10,000 p.s.i., it is believed that water penetrated the seal of the spheres tested and, as explained in more detail hereinafter, caused hydraulic fracturing in the glass which resulted in catastrophic and rapid implosion of the glass spheres.

It is, therefore, a general object of the invention to provide an improved oceanographic, underwater spherical glass instrument housing.

It is a particular object of the invention to provide an improved method of assembling an oceanographic, underwater spherical glass instrument housing.

The features of this invention which are believed to be novel are set forth with particularity in the appended claims. The invention, together with further objects and advantages thereof, may best be understood, however, by reference to the following description taken in conjunction with the accompanying drawings, in the several FIGS. of which like reference numerals identify like elements, and in which:

Figure 1:
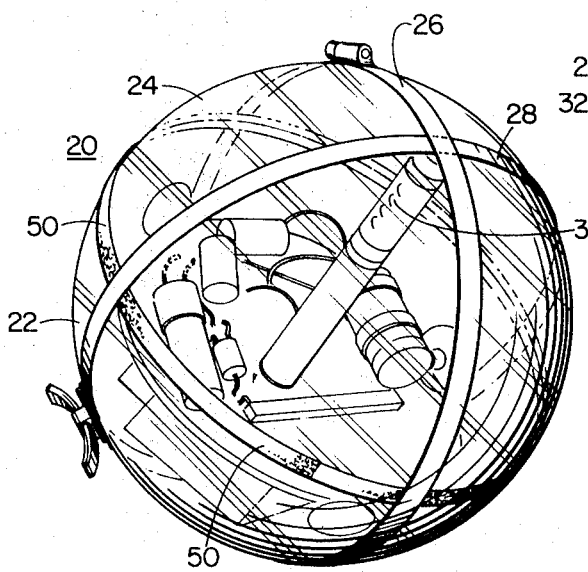
FIG. 1 is a perspective view of an oceanographic, underwater spherical glass instrument housing showing an electronic flash recovery system mounted therein.

FIG. 1 illustrates generally oceanographic, underwater spherical glass instrument housing 20 comprising hemispheres 22 and 24 with hose clamps 26 and 28 positioned perpendicular to each other and to seal 50. Flashtube 30 of an electronic flash recovery system is visible through the transparent wall of the sphere.

Figure 2:
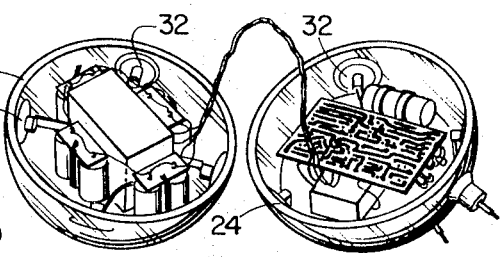
FIG. 2 is a perspective view of the hemispheres of such a housing placed side by side showing a radio beacon mounted therein.

FIG. 2 illustrates hemispheres 22 and 24, placed side by side, before sealing, and containing a radio beacon. Note that the radio beacon components are attached to suction cups 32 secured to the inner wall of the hemispheres.

Figure 3:
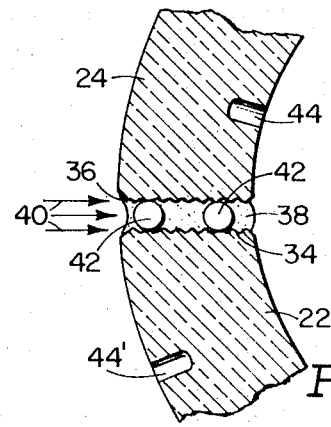
FIG. 3 is a partial sectional view of the confronting hemispheres useful in explaining how hydraulic fracturing occurs.
Figure 4:
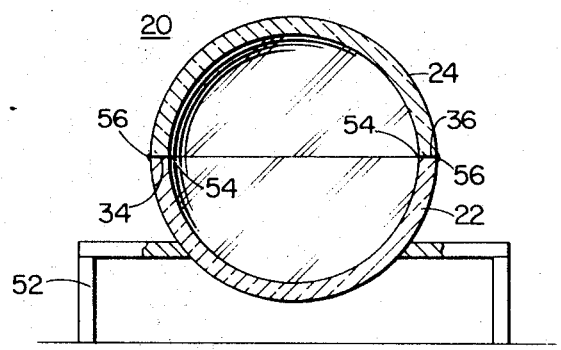
FIGS. 4, 5, 6 and 7 illustrate diagrammatically the seal utilized in the spherical glass instrument housing of the present invention.

Referring now to FIG. 3 the mating surfaces 34 and 36 of hemispheres 22 and 24 respectively, are ground to a flatness of ±0.001 inch. In one unsuccessful seal tried heretofore, silicon grease 38 was placed between mating surfaces 34 and 36. Hose clamps 26 and 28 were then carefully mounted and tightened to prevent slippage of the hemispheres with respect to each other. In a large percentage of the spheres tested at pressures of 10,000 p.s.i.g., the hydraulic pressure, here represented by arrows 40, was transmitted either through the grease, or as theorized by others, by molecules or droplets 42 of water, against mating surfaces 34 and 36. It is believed by some that the great pressure so applied sets up radial tension stresses in the wall of the glass. The presence of the grease or water pressure in the joint causes a tension crack to start at the joint and propagate spherically from it. The crack is then propagated further by the fluid entering it. (Such crack propagation is well known in oil well terminology as "hydraulic fracturing." Tight rock formations are opened by hydraulic fracturing by pumping fluid into a well at high hydrostatic pressure. The cracks formed then allow oil to flow into the well when the pressure is reduced.) Experimental evidence backs up this theory. Thus, when an interior hole 44 is drilled into the wall of a hemisphere, no fracturing occurs. However, when a hole 44' is drilled into the exterior wall of a hemisphere and left exposed to great water pressure, hydraulic fracture and resulting implosion occurs.

However, it has been found that hydraulic fracturing and implosion can be prevented with the glass housing and seal of the present invention, as will now be explained with reference to FIGS. 4, 5 6 and 7. Here, the exterior surfaces of hemispheres 22 and 24 and mating surfaces 34 and 36 are first thoroughly cleaned with toluene to remove all traces of dirt, grease and fingerprints. With hemisphere 22 securely supported as in protective stand 52 and with mating surface 34 approximately horizontal, hemisphere 24 is carefully set on hemisphere 22 so that mating surfaces 34 and 36 contact each other and the outer surfaces of the hemispheres are flush at equatorial seam 54. A continuous bead 56 of a nonhardening adhesive approximately one-eighth inch in diameter is applied around the entire length of equatorial seam 54 with no skips or voids. A rubber base nonhardening adhesive such as "Bear Weatherstrip Adhesive" is satisfactory.

When adhesive bead 56 becomes tacky in about 20 to 30 seconds flexible tape 58 is applied. Tape 58 should have an adhesive surface that does not harden. Flexible tapes made of polyvinyl chloride or polyurethane are satisfactory. With sphere 20 held firmly at the top to prevent slippage of hemispheres 22 and 24, tape 58 is applied approximately centered about equatorial seam 54. Tape 58 is wrapped tightly around equatorial seam 54 and is stretched as it is wrapped so it conforms to the curve of sphere 20. Wrapping is stopped short of starting point 60. If tape 58 near starting point 60 is then not as snug and smooth as that around the rest of equatorial seam 54, a section 62 approximately 2 inches long is cut away and removed. A similar section of bead 56 will also be removed and a new section 64 of bead 56 is reapplied along the exposed seam between the hemispheres. It is now very important that a bead 66 of the same nonhardening adhesive be applied along the transverse cut edge of tape 58. As soon as the sections 64 and 66 are tacky, wrapping of tape 58 is completed, overlapping bead 66 by about 2 or 3 inches. Tape 58 is cut from the supply roll, being careful not to cut through the first layer of tape. Tape 58 is then rubbed smooth all around the equator, using hand pressure.

If tape 58 near starting point 60 is sufficiently snug and smooth, a bead of nonhardening adhesive is applied to the transverse edge of tape 58 at starting point 60 and wrapping is completed as described above.

Figure 6:
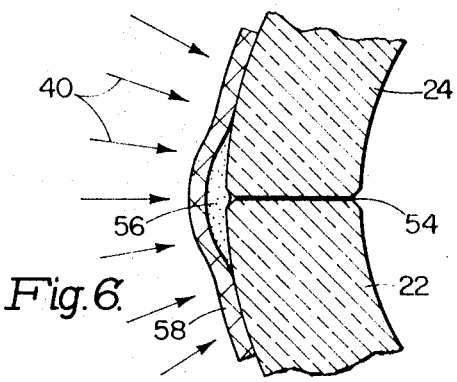
Figure 5:
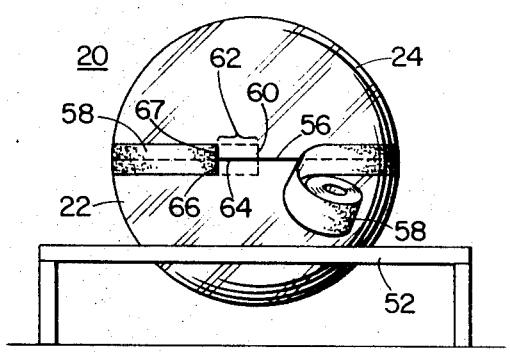

FIG. 6 illustrates in an enlarged view how bead 56 and tape 58 seal seam 54. Bead 56 not only covers seam 54 but adheres to the glass walls on both sides thereof. Tape 58 covers bead 56 completely and seals to the walls beyond bead 56. Hydraulic pressure, as represented again by arrows 40, serves to make the seal tighter and prevents the entry of water under pressure into seam 54.

Figure 7:
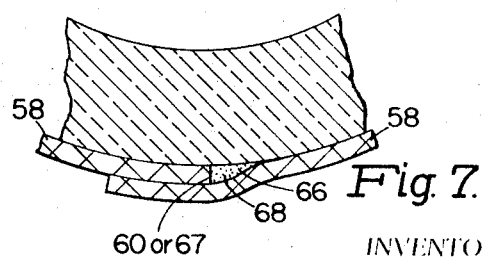

FIG. 7 illustrates the necessity for applying bead 66. At the joint where tape 58 overlaps either at the cut transverse edge 67 of tape 58 or at the starting edge 60 of tape 58, a triangular-shaped void 68 would exist through which water under pressure could penetrate bead 56 into seam 54. However, when void 68 is filled with a bead of the same nonhardening adhesive and that bead is covered with tape 58 as illustrated, it is completely sealed.

In a second embodiment, flexible tape 58 is applied directly to equatorial seam 54 without bead 56 and wrapping is again stopped short of starting point 60. After removal of 2-inch section 62, if necessary, with a suitable cutting tool, a bead 66 of the same nonhardening adhesive is applied along the transverse cut edge 67 of tape 58. Otherwise, the bead is applied to the starting edge 60. As soon as bead 66 is tacky, wrapping of tape 58 is completed, overlapping bead 66 by 2 or 3 inches.

The spherical glass instrument housing of the present invention has been successfully and consistently tested at much greater pressures than the above mentioned 10,000 p.s.i.g. and is now considered reliable and commercially useful for worldwide oceanographic applications.

I claim:

1. An oceanographic spherical glass instrument housing comprising:
   two hemispheres having mating surfaces placed in contact with each other so that the outer surfaces are flush at a seam around an equator to form the sphere; and
   a seal applied to the seam comprising a flexible tape having a nonhardening adhesive surface wrapped firmly, starting from an edge of tape transverse to the seam, around the seam, conforming and adhering to the curve of the sphere, and covering and overlapping a bead of a nonhardening adhesive applied to the transverse starting edge of the tape.

2. An oceanographic spherical glass instrument housing as in claim 1 further comprising a continuous bead of a nonhardening adhesive applied to the seam between the tape and the sphere.

3. An oceanographic spherical glass instrument housing as in claim 1 in which:
   the bead of nonhardening adhesive has a rubber base; and
   the tape is made of polyvinyl chloride.

4. An oceanographic spherical glass instrument housing as in claim 1 in which:
   the bead of nonhardening adhesive has a rubber base; and
   the tape is made of polyurethane.

5. An oceanographic spherical glass instrument housing as in claim 2 in which:
   the beads of nonhardening adhesive have a rubber base; and
   the tape is made of polyvinyl chloride.

6. An oceanographic spherical glass instrument housing as in claim 2 in which:
   the beads of nonhardening adhesive have a rubber base; and
   the tape is made of polyurethane.

7. The method of assembling an oceanographic underwater spherical glass instrument housing having two hemispheres comprising:
   placing one hemisphere on the other hemisphere so their outer surfaces are flush at a seam around an equator;
   firmly wrapping a flexible tape having a nonhardening adhesive surface almost complete around the seam, but stopping short of the starting transverse edge of the tape;
   applying a bead of a nonhardening adhesive to the starting transverse of edge of the tape; and
   completing wrapping of the tape, overlapping the transverse starting edge a short distance.

8. The method as in claim 7 further comprising applying a bead of a nonhardening adhesive around the seam before starting to wrap the tape.

9. The method of assembling an oceanographic underwater spherical glass instrument housing having two hemispheres comprising:
   placing one hemisphere on the other hemisphere so their outer surfaces are flush at a seam around an equator;
   firmly wrapping a flexible tape having a nonhardening adhesive surface almost completely around the seam, but stopping short of the starting, transverse edge of the tape;
   removing a short section of the tape beginning at the transverse starting edge, leaving a cut transverse edge of tape;
   applying a bead of a nonhardening adhesive to the cut transverse edge of the tape; and
   completing wrapping of the tape, overlapping the transverse cut edge a short distance.

10. The method of claim 3 further comprising:
   applying a bead of a nonhardening adhesive around the seam before starting to wrap the tape; and
   reapplying a bead of the nonhardening adhesive to the portion of the seam from whence it was removed with the short section of tape.